Dec. 2, 1958   L. W. JOHNSON ET AL   2,862,532
GANG SAWMILL
Filed Sept. 23, 1955   6 Sheets-Sheet 3

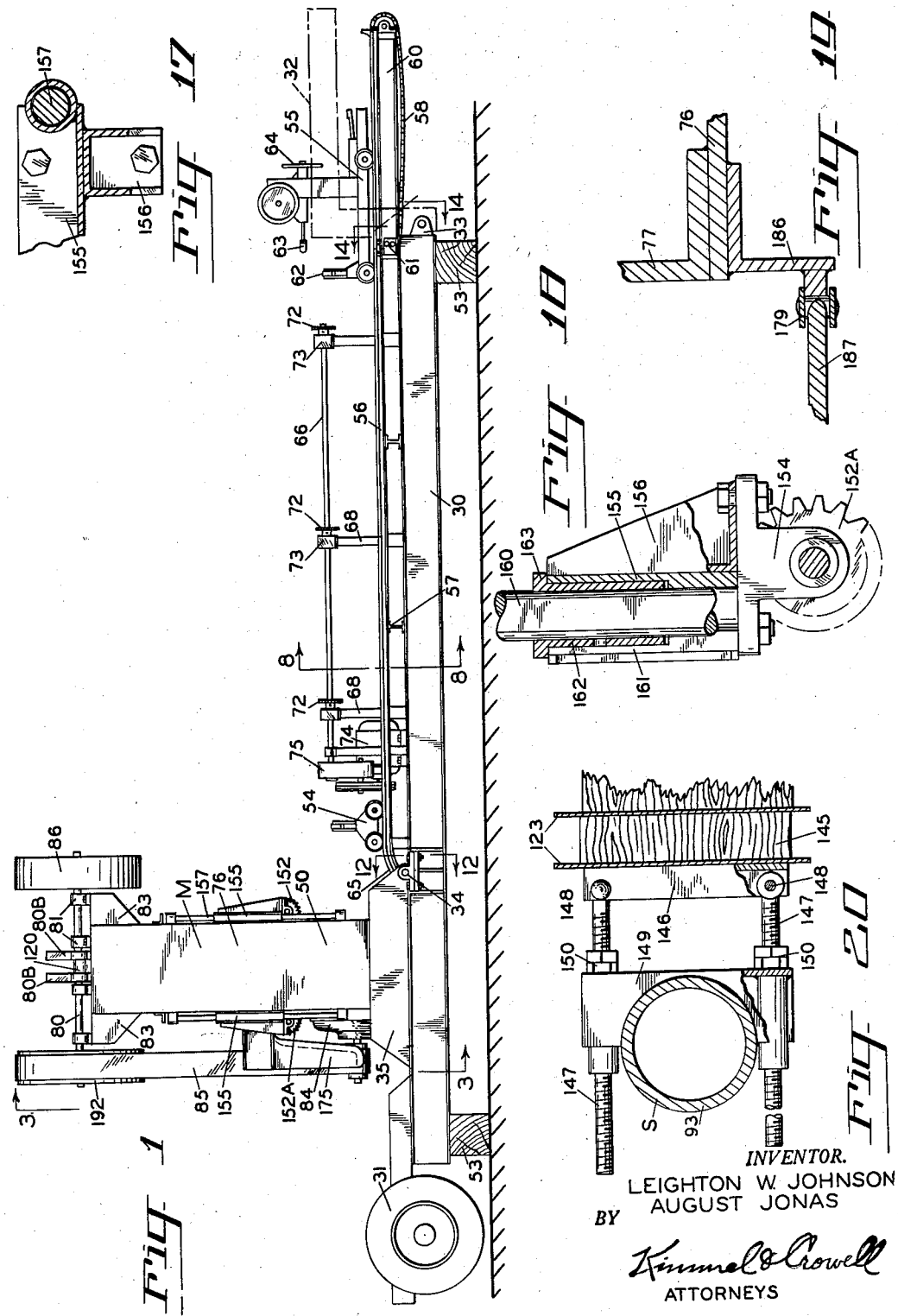
Dec. 2, 1958 — L. W. JOHNSON ET AL — 2,862,532
GANG SAWMILL
Filed Sept. 23, 1955 — 6 Sheets-Sheet 1
INVENTOR.
LEIGHTON W. JOHNSON
AUGUST JONAS
BY
Kimmel & Crowell
ATTORNEYS

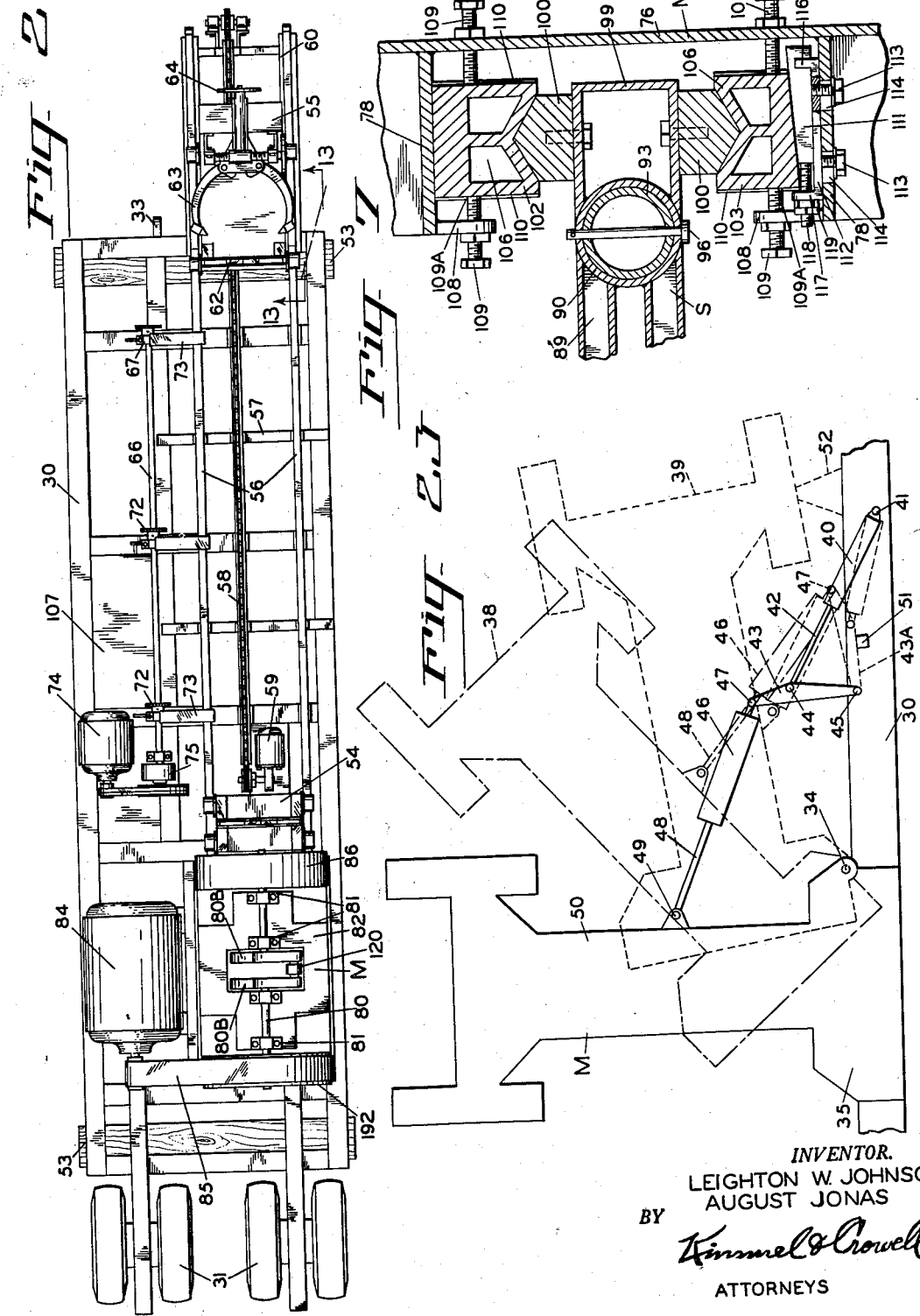

INVENTOR.
LEIGHTON W. JOHNSON
AUGUST JONAS
BY
Kimmel & Crowell
ATTORNEYS

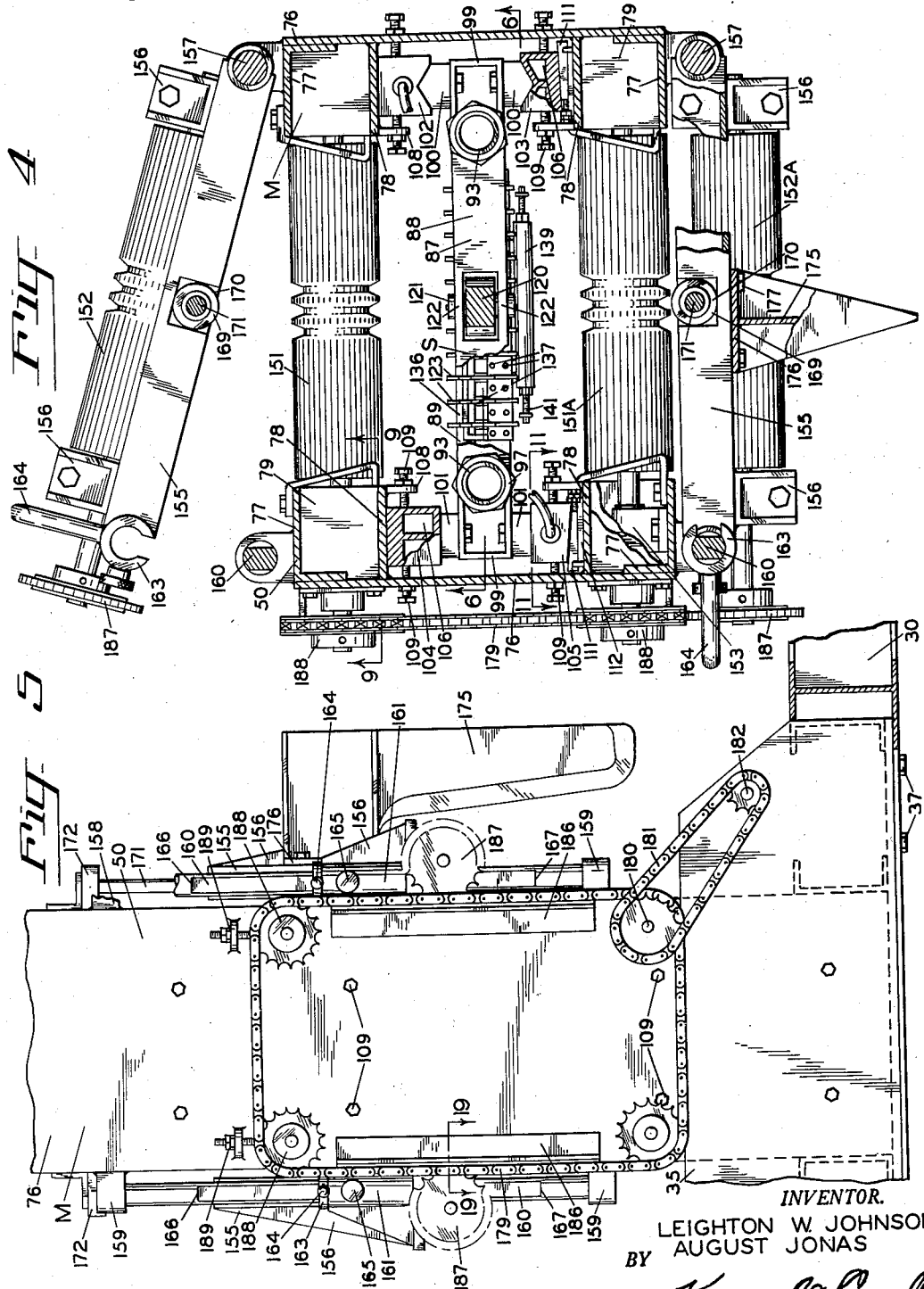

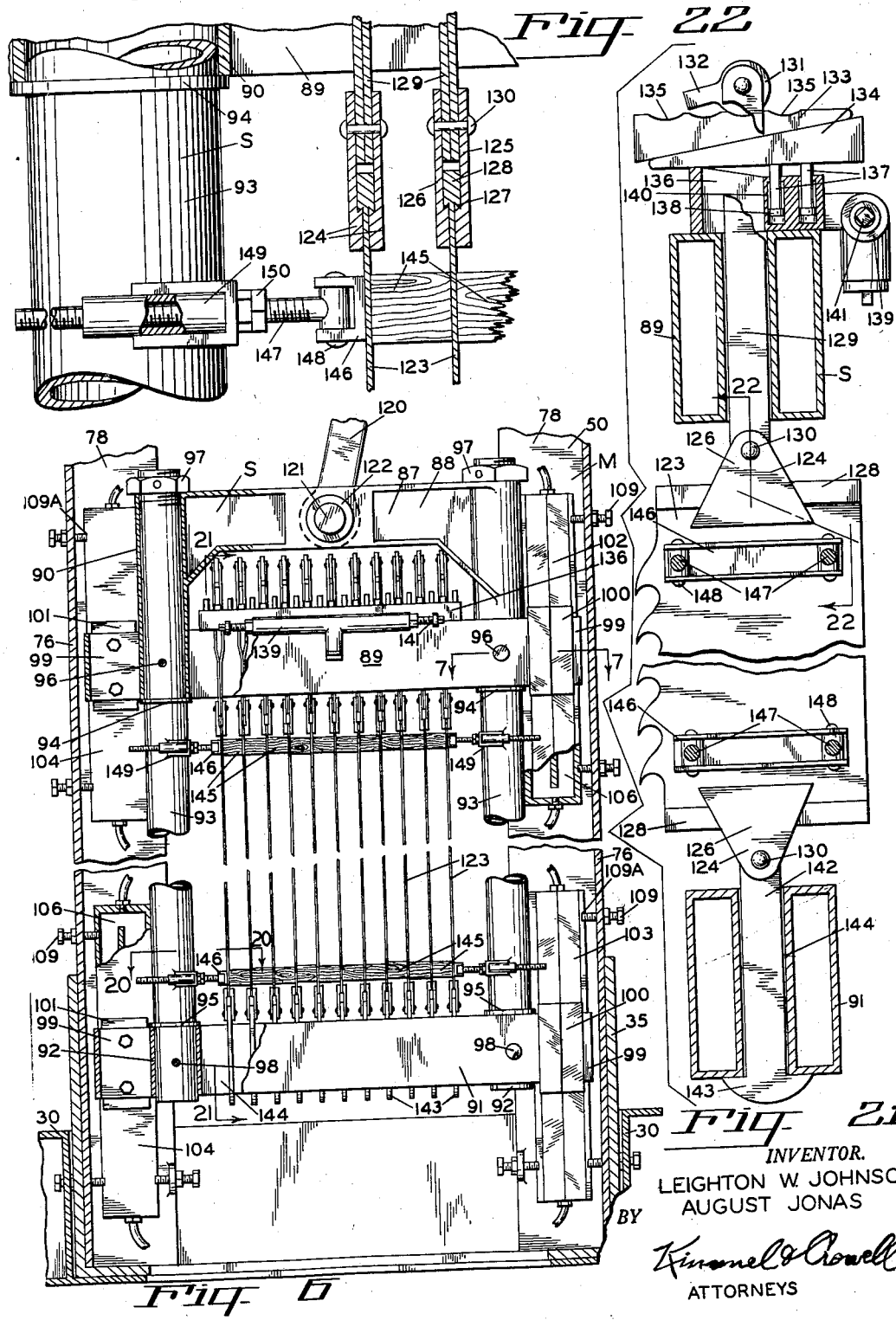

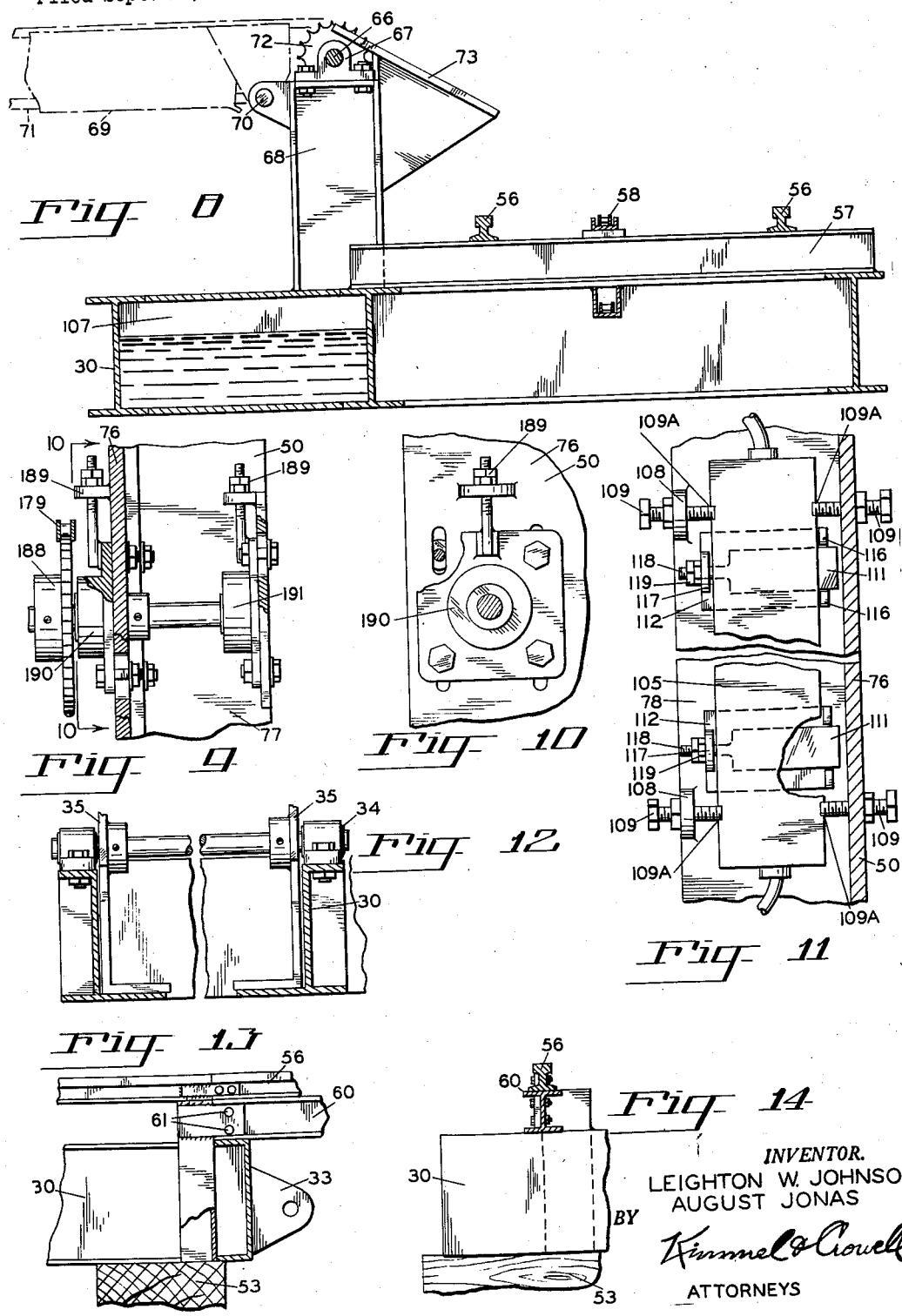

United States Patent Office 2,862,532
Patented Dec. 2, 1958

2,862,532

GANG SAWMILL

Leighton W. Johnson and August Jonas, Portland, Oreg.

Application September 23, 1955, Serial No. 536,225

8 Claims. (Cl. 143—60)

This invention relates to gang sawmills, and is particularly adapted to be used as a portable gang saw.

The primary object of the invention is to provide a gang sawmill that can be mounted on a trailer, and is operated from a crank shaft mounted on top of the gang saw so that when the trailer is pulled into an operation location it will not require the digging of a pit under the gang saw, as has heretofore been necessary in the operation of a gang sawmill. With this new and improved gang sawmill the same is moved on to location and supported upon timbers, still remaining on the frame of the trailer, without the necessity of casting special foundations.

Another object of the invention is to provide a structure of the class described with the ability to fold the body of the gang saw into a horizontal position on the trailer while moving over the highways, while providing the proper and necessary clearances for transporting the same, with an even distribution of the weight of the same, with an even distribution of the weight of the gang saw on the trailer and a low center of gravity.

A further object of the invention is to provide a sawmill with a demountable saw sash that can be easily removed or replaced within the frame of the machine.

A still further object of the invention is to provide a sawmill in which the various parts of the machine can be folded into a condensed space while moving from place to place.

Another feature of the invention is that the power plant and other heavy parts can be easily removed to lower the weight of the machine while being transported over the highway to conform to State laws.

A further object of the invention is to provide a sawmill with water cooled guideways for guiding the saw sash in its operation, the cooling water being supplied from built-in reservoirs within the trailer frame.

Another object of the invention is to provide a sawmill utilizing the type of flywheel covered by Leighton W. Johnson's copending application, Serial No. 454,468, filed September 7, 1954, and abandoned, wherein practically all vibration is eliminated in the operation of the gang saw. This allows the design illustrated in this application to be practical in its operation without the use of heavy permanent concrete foundation.

Other objects and advantages will become apparent in the following specification when considered in the light of the attached drawings, in which:

Figure 1 is a side elevation of the gang saw in operating position. This view includes the trailer frame, gang saw itself and the lock handling equipment.

Figure 2 is a plan view of the gang saw.

Figure 4 is a horizontal cross-section, taken on line 4—4 of Figure 3, looking in the direction of the arrows, with parts broken away for convenience of illustration.

Figure 5 is a fragmentary longitudinal cross-section, taken on line 5—5 of Figure 3, looking in the direction of the arrows.

Figure 6 is a transverse cross-section, taken on line 6—6 of Figure 4, looking in the direction of the arrows, with parts broken away for convenience of illustration.

Figures 3, 15, 16:
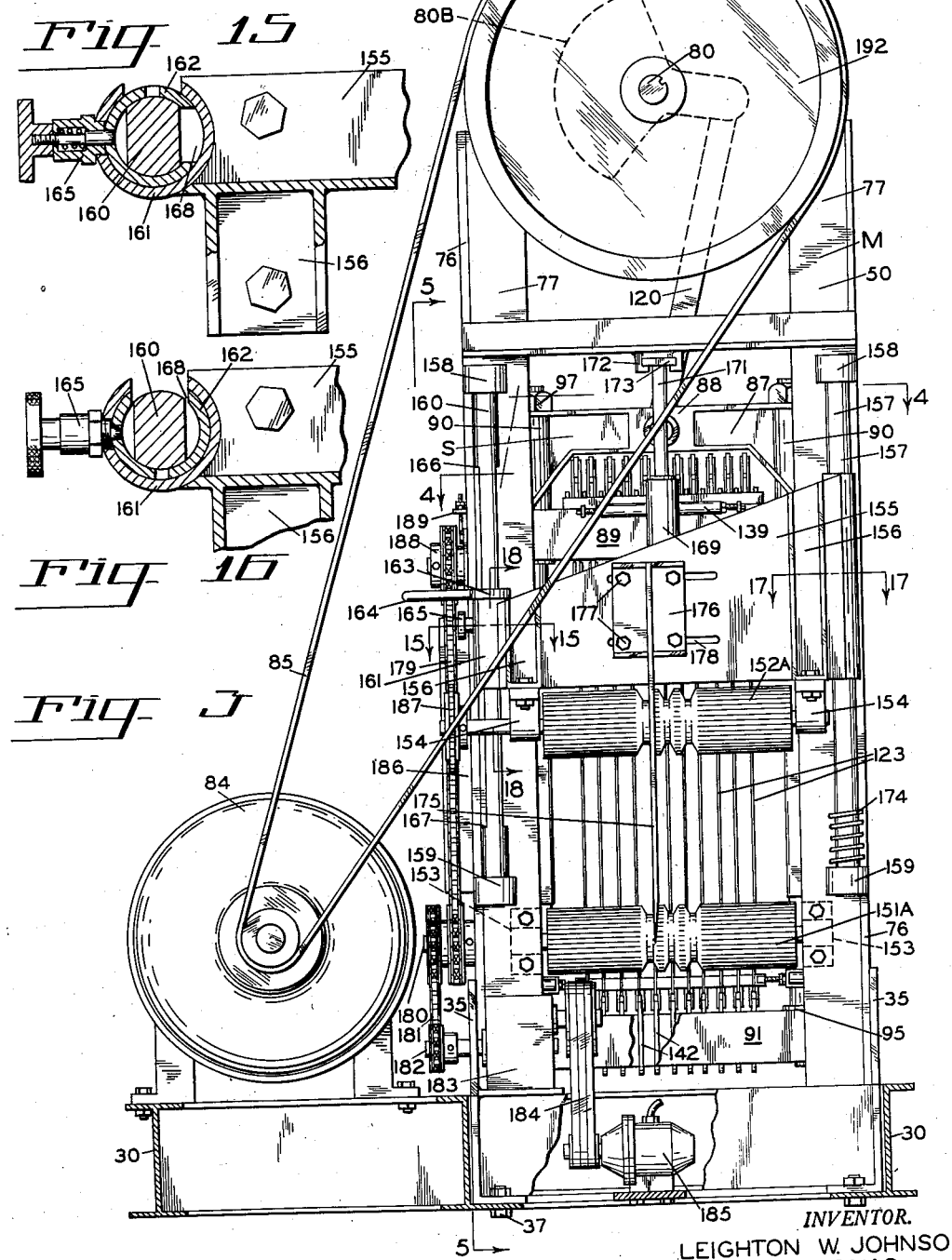
Figure 3 is a transverse vertical section, taken on line 3—3 of Figure 1, looking in the direction of the arrows, with parts broken away for convenience of illustration.

Figure 7, sheet 2, is a fragmentary horizontal section, taken on line 7—7 of Figure 6, looking in the direction of the arrows.

Figure 8, sheet 6, is a transverse vertical cross-section, taken on line 8—8 of Figure 1, looking in the direction of the arrows.

Figure 9 is a fragmentary vertical cross-section, taken on line 9—9 of Figure 4, looking in the direction of the arrows, with parts broken away for convenience of illustration, of one of the drive sprockets for driving the feed roll.

Figure 10 is a fragmentary horizontal cross section, taken on line 10—10 of Figure 9, looking in the direction of the arrows, with parts broken away for convenience of illustration.

Figure 11 is a fragmentary vertical cross section of the means for adjusting the sash guides, taken on line 11—11 of Figure 4, looking in the direction of the arrows, with parts broken away for convenience of illustration.

Figure 12 is a fragmentary transverse vertical cross section, taken on line 12—12 of Figure 1, looking in the direction of the arrows.

Figure 13 is a fragmentary longitudinal section, taken on line 13—13 of Figure 2, looking in the direction of the arrows, illustrating how the frame of the trailer is extended for sawing operations.

Figure 14 is a fragmentary transverse vertical cross section, taken on line 14—14 of Figure 1, looking in the direction of the arrows, showing the end of the trailer frame and illustrating how the extension frame is secured thereto as in Figure 13.

Figure 15, sheet 3, is a fragmentary plan horizontal section, taken on line 15—15 of Figure 3, looking in the direction of the arrows, showing the locking mechanism for holding the feed rolls in operating position.

Figure 16 is a view similar to Figure 15, except that the lock is shown released ready to permit the feed roll gate to be swung into the open position shown in Figure 4.

Figure 17, sheet 1, is a horizontal section of the pivot end of the feed roll gate assembly, taken on line 17—17 of Figure 3, looking in the direction of the arrows.

Figure 18 is a fragmentary longitudinal section illustrating the locking mechanism for the feed roll gate, taken on line 18—18 of Figure 3, looking in the direction of the arrows, with parts broken away for convenience of illustration.

Figure 19 is a fragmentary transverse cross section, taken on line 19—19 of Figure 5, looking in the direction of the arrows, illustrating the drive chain in relation to the feed roll driven sprocket.

Figure 20 is a fragmentary transverse horizontal cross section of the lower part of the sash frame, taken on line 20—20 of Figure 6, looking in the direction of the arrows.

Figure 21, sheet 5, is a fragmentary longitudinal cross section, taken of the saw sash on line 21—21 of Figure 6, looking in the direction of the arrows, with parts broken away for convenience of illustration.

Figure 22 is an enlarged fragmentary detail transverse cross section, taken on line 22—22 of Figure 21, looking in the direction of the arrows.

Figure 23, sheet 2, is a schematic diagram illustrating the mechanism for raising or lowering the sawmill upon the trailer frame, the sawmill being shown in various positions of adjustment by full lines, broken lines and dotted lines.

This new and improved gang sawmill as adapted to a portable gang saw consists of a base frame 30, mounted upon supporting wheels 31 on its one end and having a tongue 32 removably secured to its opposite end to the ears 33. The tongue 32 is adapted to be connected to a tractor, not here shown. The gang saw is indicated in general by the letter M and is pivotally mounted to the frame 30 at 34, and has its base 35 pivotally attached at 34 to the frame 30, referring particularly to Figure 23, sheet 2. The opposite side of the base is bolted to the frame by the bolts 37, Figures 3 and 5.

The gang saw M is moved from the full line position to the broken line position, in Figure 23, sheet 2, as indicated by numerals 38 and 39, or vice versa. A hydraulic jack 40 is pivotally mounted to the frame 30 at 41, while its piston rod 42 is pivotally connected to the lever 43 at 44. The lever 43 is in turn pivotally mounted to the frame 30 at 45. A second hydraulic cylinder 46 is pivotally mounted at 47 to the lever 43 and has its piston rod 48 pivotally mounted at 49 to the sawmill frame 50.

In the operation of the raising and lowering of the gang saw M the following takes place. In the lowering of the gang saw M from the full line position to the broken line position 38, the hydraulic cylinder 40 and its piston rod 42 will lower the lever 43 to the dotted position 43A against the stop 51. The hydraulic cylinder 46 will then lower the gang saw M to the dotted line position 39, the gang saw M coming to rest on a supporting rest 52, which carries the weight of the load in transit. In the raising of the gang saw M to the full line position, the reverse action takes place. There may be a single set of cylinders, or there may be a double set of cylinders.

When the gang saw M has arrived at its destination, the tractor is removed from the same, together with its tongue 32 and the frame 30 then is jacked up on supports 53. The gang saw M needs no other supports in its operation. Log supporting dollies 54 and 55 operate on tracks 56, which in turn are mounted to the frame 30 by way of the cross beams 57. The tracks 56 and dollies 54 and 55 are of conventional structure.

The dolly 55 is moved by the endless chain 58, which is driven from the motor transmission unit 59, Figure 2. On removing the tongue 32, the extension base frame 60 is bolted to the end of the frame 30 at 61, referring to Figures 13 and 14. The tracks 56 extend over this frame 60 being supported thereby. One end of the log rests on the V-block 62 of the dolly 55 and is clamped thereto by the tongs 63 operated through the hand wheel 64 by an operator. Means (not shown) are provided within the dolly structure, as usual, for centering the log. The opposite end of the log rides on the dolly 54. When the log enters the gang saw M, to be described later, the dolly 54 rides down the inclined portion 65, Figure 1, of the tracks 56.

A longitudinally mounted shaft 66 is journalled within bearings 67 upon the pedestals 68, referring to Figure 8. The horizontal conveyor frames 69 are pivotally connected at 70 to the pedestals 68 and have the conveyor chains 71 driven by the shaft 66 through the sprockets 72. These horizontal conveyors 71 move the log over to the gang saw M from a distant point allowing the log to roll down the inclined tracks 73 on to the dollies 54 and 55. In moving the gang saw M, the horizontal conveyors 71 are removed. The shaft 66 is driven by the motor 74 and gear reduction box 75, referring particularly to Figure 2.

We will now describe the structure of the gang saw M. Mounted upon the base 35 are vertical side plates 76 which are welded to the said base 35. Vertical angles 77, Figure 19, sheet 1, are also welded, or otherwise secured, to the base and to the vertical plates 76. Flat bars 78, Figure 7, sheet 2, are also welded vertically to the side plates 76 and are spaced from the angles 77 by webs 79, Figure 4, which are spaced apart throughout the height of the framework.

A crank shaft 80 is journalled within bearings 81, which are mounted to the upper horizontal framework 82, Figure 2. This horizontal framework 82 is further supported by the gusset plates 83, referring particularly to Figures 1 and 2. The crank shaft 80 is driven from the motor 84 (shown as electric but a gasoline or diesel motor would serve as well) by the belt 85. Mounted to the opposite end of the crank shaft 80 is a flywheel 86, which is covered by the pending application mentioned above. The flywheel 86 renders the operation of the gang saw M practically vibrationless.

The sash for holding the saw is indicated by the letter S, Figures 3 and 6. The sash S consists of an upper frame 87, which may be fabricated or cast. This frame 87 consists of cross member 88 and a cross member 89, preferably formed in one piece. The cross member 89 is of a double tubular structure, forming part of the intermediate tubes 90. The lower end of the sash S consists of a transverse framework 91 of similar structure as that of the cross member 89. This frame 91 has vertical guides 92 forming part of its end. The upper frame 91 is connected together by the vertical tubes 93, as best illustrated in Figures 6 (sheet 5) and 7 (sheet 2).

The cross member 89 rests on collars 94, while collars 95 bear against the lower cross member 91. The upper framework 87 is further locked in place by the pins 96 and the hold down nuts 97. The lower transverse framework 91 is also fastened to the rods 93 by the pins 98.

The ends 99 of the cross members 89 and 91 extend beyond the vertical rods 93, as best illustrated in Figures 4, 6 and 7. These ends 99 are adapted to hold the vertical V-guides 100 and the flat guides 101. These guides 100 and 101 are adapted to operate within the V-guideways 102 and 103, and flat guideways 104 and 105, respectively. All guideways 102, 103, 104 and 105 are cored out at 106 and are adapted to have cooling water circulated therethrough for keeping them cool in operation. The water to be supplied to these guides 102, 103, 104 and 105 is stored in the tank 107, referring to Figures 2 and 8, particularly. The sash guideways 102, 103, 104 and 105 are best illustrated in Figures 4, 6, 7 and 11.

A pumping system has not been illustrated in the drawing, but there would be a special water circulating mechanism.

The guideways 102, 103, 104 and 105 are adjustably mounted to the side plates 76 and the vertical flat bars 78 by way of the outwardly extending ears 108. Set screws 109 pass through the side plate 76 and the ears 108, their tips 109A registering with the transverse grooves 110 on the sides of the guideways 102, 103, 104 and 105, centering and holding the guides 102, 103, 104 and 105 in the desired adjusted position.

In reference to the guideways 103 and 105, means is provided for moving the guideways 103 and 105 away or towards the guides 100 and 101 by wedges 111, Figure 7. Adjustable guide pieces 112 are secured by bolts 113 within the horizontal slots 114 formed in the vertical flat bars 78. These guide pieces 112 are adapted to guide the wedges 111 by way of the outwardly extending ears 116. Ears 117 are formed on the end of the guide pieces 112 and are adapted to receive the screws 118 which form part of the wedges 111. The locking nuts 119 adjust the wedge 111 to the proper position for giving the exact clearance between the guideway and guides of the sash.

The sash S is operated by the connecting rod 120, which is operated from the crank shaft 80, as best illustrated in Figures, 6, sheet 5, and 15, sheet 3. The lower end of the connecting rod 120 is pivotally connected to the wrist pin 121, which is journalled between bosses 122 forming part of the upper frame 87.

Referring particularly to Figure 6, sheet 5, Figure 20, sheet 1, and Figures 21 and 22, sheet 5, fixedly secured to the upper and lower ends of the saws 123 are clamping jaws 124. These jaws 124 consist of jaw members 125 and 126. Their ends adjacent the saw 123 being dovetailed at 127 and adapted to fit into the cross head members 128 which form part of the saws 123.

Connected to the opposite ends of the upper jaws 124 are double links 129 by rivets 130. These links 129 diverge at their upper ends and have journalled therebetween eccentrics 131. These eccentrics 131 have levers 132 forming part thereof. The purpose of the levers 132 will be described later on. The eccentrics 131 are supported by the wedges 133 and 134. The wedges 133 have depressions 135 formed therein and adapted to receive the eccentric 131, as best illustrated in Figure 21.

The wedges 134 rest upon the sub-base 136 at their one ends and upon the plungers 137 at their opposite ends. Formed on the lower ends of the plungers 137 are pistons 138 and running longitudinally of the base 136 is a manifold 139. While not shown in detail in the drawings, hydraulic fluid under pressure is delivered from the manifold 139 to each cylinder 140 associated with the pistons 138.

Hydraulic pressure is created within the manifold 139 by the adjusting of the screws 141. The further these screws 141 enter the manifold 139 the greater will become the pressure of the fluid being delivered from the manifold 139 into each of the cylinders 140. This raises the plungers 137 equally in lifting power against the wedges 134 which provides an even tension on the saws 123 when this hydraulic pressure is applied.

The lower ends of the saws 123 are secured to the cross framework 91 by the links 142 being connected to the jaw assembly 124 by the rivets 130. The lower ends of the links 142 have cross heads 143 for anchoring them within the transverse slot 144 of the framework 91. This feature stabilizes the saws 123. Spacer blocks 145 are compressed between the saws 123 in the following manner.

A cross head 146 is forced against the outer saws 123 by the adjustable threaded bolts 147, which are at one end thereof riveted at 148 to the crosshead 146, while their opposite ends pass through the saddles 149 which form part of the tubes 93 of the sash. The lock nuts 150 are adapted to make this adjustment, compressing the spacer blocks 145 between the saws 123, as best illustrated in Figures 6, 20, 21 and 22.

When the saws 123 are in place as illustrated, a course, tightening adjustment is obtained by adjusting the wedges 133 and 134 under the eccentrics 131. The saws 123 may be further tightened by another adjustment when the levers 132 could be struck with a hammer or sledge revolving the eccentric 131 to the position in the drawings, although this may not be necessary when the hydraulic tightening takes place as described below. Each saw 123 is placed under an equal tension with the adjacent saws 123 and as above stated.

The log is delivered on to the driven roller 151 by dollies 54 and 55. Before the log reaches the driven rollers rollers 151 and 151A, the operator adjusts the elevation of the driven roller 152 to the approximate height inside for contacting the upper surface of the log. The lower driven rollers 151 and 151A are journalled within bearings 153, referring to Figures 3 and 4, within the vertical angles 77 of the frame. The upper driven rollers 152 and 152A are journalled within bearings 154. These bearings 154 are mounted to the swinging gates 155 and brackets 156, as best illustrated in detail in Figures 15 and 16, sheet 3 and Figure 17, sheet 1. The gates 155 are rotatably mounted to the vertical posts 157. The posts 157 are fixedly secured to the brackets 158 and 159, Figure 3, forming part of the frame 30. The opposite end of the gate 155 is adapted to embrace the vertical post 160, in the following manner, posts 160 being fixedly mounted to the brackets 158 and 159 forming part of the framework 30 of the gang saw M.

Formed on the swinging end of the gate 155 is a cylindrical open sided jaw 161. Within this jaw 161 is journalled an open sided cylinder 162. Formed on the upper end of this cylinder 162 is a flange 163 and a lever 164. When it is desired to move the gate 155 into open position the locking cylinder 162 is revolved to the position shown in Figures 4 and 16 by the lever 164 and is held in this position by the spring plunger 165.

The posts 160 are flattened from the point 166 to the point 167, making it possible for the open sides of the jaw 161 and the open side 168 of the locking cylinder 162 to embrace the posts as illustrated in Figures 4 and 16. At this time the handle 164 is rotated to the position shown in Figures 3 and 4. The object of hanging the driven rollers 152 to the swinging gates 155 is to be able to move these rollers 152 away from the saw sash assembly so that the sash and saws 123 are readily accessible for adjustment and so forth.

The elevation of the rollers 152 and the gates 155 is determined by the hydraulic cylinders 169, Figure 2, which are fixedly secured to the gates 155 at 170 and have their piston rods 171 slidably mounted within the hangers 172 by cross head 173. The hanger 172 is to permit the piston rod 171 to move away from the hanger 172 becoming disengaged from the hanger 172 when the gates 155 are lowered down onto the bumper springs 174. These bumpers 174 support the weight of the gates 155 so that the piston rods 171 can be disengaged from the hanger 172. The operator can raise and lower the gates 155 by a control valve and hydraulic fluid, not here shown, by way of the hydraulic cylinder 169.

These cylinders 169 are preferably of a two-way design so that the driven rollers 152 can bear down against the log feeding the same through the saws 123. Located on the face of the gate 155 located at the discharge side of the gang saw M is a vertical plate 175, adapted to enter between the kerf of the log and assist to guide the log through the saws 123. This plate is hung by the bracket 176. The bracket 176 is supported to the sides of the gates 155 by the bolts 177, which are adjustable in the cross slots 178.

The driven rollers 151, 151A, 152 and 152A are driven by the chain 179, referring to Figures 3, 4, 5, 9, 10 and 19. The chain 179 is driven from the shaft 180, which in turn is driven by the chain 181, shaft 182 by way of the gear box 183, belts 184 to the driving motor 185, referring particularly to Figure 3. The chain 179 is picked up by guides 186, while the sprockets 187 of the rollers 152 and 152A are driven through these sprockets 187 and through the chain 179 at any point of elevation.

The sprockets 188 are idlers and are adjustable by the adjustable mechanism 189. These idler sprockets 188 are journalled within the bearings 190 and 191 which are secured to the side plates 76 and vertical angles 77 of the gang saw M, referring particularly to Figures 9 and 10. The crank shaft 80 is driven by the belt 85 from the motor 84. The crank shaft 80 is counterbalanced by the counterweights 80B.

We will now describe the operation of the gang saw M as considered from a portable standpoint. After the gang saw M has been erected, as shown in the main views, the log is then fed on to the dollies 54 and 55 by the conveyor chains 71 and the log is grasped on the outboard end by clamping tongs 63, as described above in the specification, which centers the log on the dollies 54 and 55. The hydraulic cylinder 169 is caused to raise the hold down feed rollers 152 and 152A to a raised position. The chain 58 is then operated by the motor 59 so as to move the end of the dolly 54, together with the log towards the feed roller 151. After this happens the dolly 54 will roll down the inclined portion 65 of the track 56. There is a cable (not shown) secured to the dolly 54 to pull it back up on the gang saw M portion of the track 56 for the next log.

After the log is placed on to the feed roller 151, the hold down roller 152 is lowered by the hydraulic cylinder 169. The feed rollers 151, if not running, are then started, feeding the log into the saws 123 which are at this time operating. After the log passes through the saws 123 a sufficient distance the hold down driven rollers 152A are lowered by the hydraulic cylinder 169, thereby assisting in pulling the log through the saw 123 and completely removing the same after it is cut. The guide plate 175 maintains the log in alignment after entering the kerf made by one of the saws 123. This completes a cycle of operation.

A conventional conveyor system (not shown) is used to transport the cants of the log to their destination.

Having thus described the preferred embodiment of the invention, it should be understood that numerous modifications and structural adaptations may be resorted to without departing from the scope of the appended claims.

What is claimed is:

1. A portable sawmill comprising a trailer, a horizontal framework secured to said trailer and forming a portion thereof, vertical framework, vertically reciprocable saws mounted in said vertical framework, means on said vertical framework above said horizontal framework for reciprocating said saws, and hydraulic means extending between said vertical framework and said horizontal framework to move said vertical framework into a portable position substantially parallel to said horizontal framework, said hydraulic means including a lever pivotally secured to said horizontal framework, a hydraulic ram secured to said horizontal framework at one end and having the piston rod thereof secured at its outer end to said lever intermediate the opposite ends thereof, a second hydraulic ram secured to the outer end of said lever and having its piston rod secured to said vertical framework whereby said vertical framework can be partially lowered toward said horizontal framework by one of said hydraulic rams and the lowering operation completed by the other of said hydraulic rams.

2. A device as claimed in claim 1, wherein said horizontal framework is provided with rails, and said means for feeding material to be sawed to said saw blades, includes carriages mounted on said rails.

3. A device as claimed in claim 2, wherein said carriages are moved by an endless chain.

4. A device as claimed in claim 1, wherein said sawmill is provided with guide means on the horizontal framework which includes a trackway, carriages movable on said trackway, and an endless chain secured to said carriages for moving said carriages on said trackway.

5. A device as claimed in claim 1, wherein said sawmill is provided with means for feeding material to said saw blades on said vertical framework which comprises rollers journalled in said vertical framework, with each of said rollers provided with a sprocket, a chain trained over said sprockets, and means for driving said chain.

6. A device as claimed in claim 1, in which said sawmill is provided with a saw frame supporting said saws in said vertical framework, means for vertically reciprocating said saw frame in said vertical framework which includes a vibration free counterweighted crank shaft having a pair of flywheels mounted on opposite ends thereof at the top of said vertical framework.

7. A device as claimed in claim 1 wherein said vertical framework is provided with vertical guides for said reciprocating saw blades, said guides each being formed with hollow conduits extending therethrough, and means for circulating a cooling fluid through said conduits.

8. A portable sawmill comprising a trailer, a horizontal framework secured to said trailer and forming a portion thereof, vertical framework, vertically reciprocable saws mounted in said vertical framework, means on said vertical framework above said horizontal framework for reciprocating said saws, hydraulic means extending between said vertical framework and said horizontal framework to move said vertical framework into a folded position substantially parallel to said horizontal framework, said hydraulic means including a hydraulic cylinder pivotally secured at one end to said horizontal framework, a lever having its lower end pivotally secured to said horizontal framework intermediate said hydraulic cylinder and said vertical framework and extending upwardly therefrom, a piston rod extending from said hydraulic cylinder and having its outer end secured to said lever intermediate the opposite ends thereof, and rigid means extending between and connecting the upper end of said lever and said vertical framework at a point thereon spaced substantially above said horizontal framework whereby movement of said piston rod into said cylinder moves said lever and through said last named means moves said vertical framework from a vertical position to a folded position with respect to said horizontal framework, said last named means having its opposite ends pivotally connected respectively to said lever and to said vertical framework.

References Cited in the file of this patent

UNITED STATES PATENTS

| Re. 10,882 | Wilkin | Nov. 15, 1887 |
| 471,125 | Kilgore | Mar. 22, 1892 |
| 719,585 | Hanssler | Feb. 3, 1903 |
| 1,481,459 | Dickie | Jan. 22, 1924 |
| 1,866,395 | Campbell | July 5, 1932 |
| 2,687,309 | Anders | Aug. 24, 1954 |

FOREIGN PATENTS

| 2,748 | Great Britain | Nov. 8, 1860 |
| 24,719 | Sweden | May 9, 1908 |
| 57,276 | Sweden | Aug. 12, 1924 |
| 72,617 | Sweden | Sept. 8, 1931 |
| 156,686 | Great Britain | Sept. 29, 1921 |
| 287,385 | Germany | Sept. 17, 1915 |
| 457,080 | Germany | Mar. 8, 1928 |
| 483,092 | Germany | Sept. 25, 1929 |
| 575,799 | Germany | May 2, 1933 |